United States Patent
Sawamoto

(10) Patent No.: US 9,409,575 B2
(45) Date of Patent: Aug. 9, 2016

(54) VEHICLE CONTROL DEVICE

(71) Applicant: HONDA MOTOR CO., LTD., Minato-Ku, Tokyo (JP)

(72) Inventor: Kiichiro Sawamoto, Kuki (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/433,905

(22) PCT Filed: Nov. 20, 2013

(86) PCT No.: PCT/JP2013/081277
§ 371 (c)(1),
(2) Date: Apr. 7, 2015

(87) PCT Pub. No.: WO2014/080940
PCT Pub. Date: May 30, 2014

(65) Prior Publication Data
US 2015/0258992 A1   Sep. 17, 2015

(30) Foreign Application Priority Data

Nov. 26, 2012   (JP) .................................. 2012-257318

(51) Int. Cl.
*B60W 30/14* (2006.01)
*G08G 1/16* (2006.01)
*B60T 7/22* (2006.01)
*B60W 30/17* (2012.01)

(52) U.S. Cl.
CPC .... *B60W 30/14* (2013.01); *B60T 7/22* (2013.01); *B60W 30/17* (2013.01); *G08G 1/166* (2013.01); *B60W 2550/10* (2013.01)

(58) Field of Classification Search
CPC . B60W 30/14; B60W 30/17; B60W 2550/10; G08G 1/166; B60T 7/22
See application file for complete search history.

(56) References Cited

U.S. PATENT DOCUMENTS

| 2004/0260439 | A1* | 12/2004 | Endo | B60Q 1/48 701/36 |
| 2008/0158046 | A1* | 7/2008 | Kai | G01S 7/4004 342/118 |
| 2009/0212930 | A1* | 8/2009 | Pfeiffer | B60Q 9/008 340/435 |

(Continued)

FOREIGN PATENT DOCUMENTS

| JP | H10-147160 A | 6/1998 |
| JP | 2001-233084 A | 8/2001 |

(Continued)

OTHER PUBLICATIONS

JP 2001-233084 Machine translation, Satoshi, 2001.*

(Continued)

*Primary Examiner* — Rodney Butler
*Assistant Examiner* — Frederick Brushaber
(74) *Attorney, Agent, or Firm* — Carrier Blackman & Associates, P.C.; Joseph P. Carrier; Jingli Wang

(57) ABSTRACT

A vehicle control device includes: a camera unit and a radar device that detect objects in front of the vehicle; and a travel control device that recognizes an object detected by the camera unit and the radar device as an object to be controlled, and performs travel control in accordance with the object to be controlled. The travel control device, when starting travel control from when the own vehicle is in a stopped state, recognizes the object to be controlled when a determination has been made that the own vehicle has moved from a stopped state to a travel state.

5 Claims, 4 Drawing Sheets

(56) References Cited

U.S. PATENT DOCUMENTS

| | | | |
|---|---|---|---|
| 2009/0242345 A1* | 10/2009 | Nakagawara | F16D 48/066 192/3.58 |
| 2010/0104199 A1* | 4/2010 | Zhang | G06K 9/00798 382/199 |
| 2010/0109908 A1* | 5/2010 | Miura | B60R 16/0232 340/905 |
| 2010/0131153 A1* | 5/2010 | Suzuki | G08G 1/166 701/36 |
| 2010/0152963 A1* | 6/2010 | Heckel | B60W 30/17 701/29.2 |
| 2010/0204870 A1* | 8/2010 | Saeki | B60W 30/17 701/31.4 |
| 2014/0104050 A1* | 4/2014 | Kuroba | G08G 1/16 340/435 |

FOREIGN PATENT DOCUMENTS

| | | |
|---|---|---|
| JP | 2002-319100 A | 10/2002 |
| JP | 2009-063439 A | 3/2009 |

OTHER PUBLICATIONS

International Search Report from PCT/JP2013/081277 having mailing date of Mar. 4, 2014 (the present application is a National Phase of PCT/JP2013/081277).

Office Action, Notice of Allowance, issued in the corresponding Japanese Patent Application 2014-548597 with the English translation thereof and mailing date of May 10, 2016.

* cited by examiner

_US 9,409,575 B2_

VEHICLE CONTROL DEVICE

TECHNICAL FIELD

The present invention relates to a vehicle control device.
Priority is claimed on Japanese Patent Application No. 2012-257318, filed Nov. 26, 2012, the content of which is incorporated herein by reference.

BACKGROUND ART

Conventionally, vehicle control devices are known which perform fixed speed travel control called cruise control or the like which maintains a vehicle speed set by a driver. Of this type of vehicle control device are known those that comprise; a trajectory estimation unit which estimates the trajectory of the vehicle based on the detection results of a yaw rate detection unit and a vehicle speed detection unit, a stopped trajectory estimation unit which, when a determination is made that the vehicle has transitioned to a stopped state, stores the estimated trajectory of the vehicle prior to stopping as the estimated trajectory of the vehicle, and a vehicle detection unit such as a stereo camera or millimeter wave radar which detects objects in a predetermined area in front of the vehicle in the traveling direction (for example, see Patent Document 1).

According to this vehicle control device, the trajectory estimation unit, even when the vehicle is stopped partway around a corner, can obtain an estimated trajectory that is close to the actual trajectory of the vehicle. Therefore when the vehicle starts moving from a stopped state partway around a corner, another vehicle on the travel trajectory estimated by the trajectory estimation unit can be accurately determined as a preceding vehicle, and acceleration and deceleration of the vehicle can be performed in a manner that accurately tracks the preceding vehicle.

DOCUMENT OF RELATED ART

Patent Document

Patent Document 1: Japanese Unexamined Patent Application, First Publication No. 2002-319100

SUMMARY OF INVENTION

Problems to be Solved by the Invention

However, in the vehicle control device of the prior art, the following points leave room for improvement.

That is to say, when the own vehicle starts moving from a stopped state, for example if another vehicle in a stopped state is present on the travel trajectory estimated by the trajectory estimation unit, the vehicle detection unit detects the other vehicle in the stopped state as an object to be controlled. As a result, the vehicle control device of the own vehicle, in accordance with the other vehicle in the stopped state detected as an object to be controlled, attempts to maintain the own vehicle in the same stopped state as the other vehicle. Accordingly, a problem occurs in that despite the driver wanting to start moving the own vehicle, he or she can not start moving the own vehicle, preventing travel control according to the intentions of the driver.

The present invention takes into consideration the above circumstances with an object of providing a vehicle control device which, when starting to drive the own vehicle, the own vehicle can start moving without the influence from objects ahead of the own vehicle, allowing travel to be controlled according to the intentions of the driver.

Means for Solving the Problem

In order to solve the above problem, the aspects of the present invention employ the following measures:

(1) A vehicle control device according to an aspect of the invention comprises: an object detection device which detects an object in front of an own vehicle; and a travel control device that recognizes the object detected by the object detection device as an object to be controlled, and performs travel control in accordance with the object to be controlled. The travel control device, when starting travel control from when the own vehicle is in a stopped state, recognizes the object to be controlled when a determination has been made that the own vehicle has moved from the stopped state to a travel state.

According to the aspect, the travel control device, when starting travel control from when the own vehicle is in a stopped state, recognizes the object to be controlled when a determination has been made that the own vehicle has moved from a stopped state to a travel state. Therefore when driving of the own vehicle starts, until the determination is made that the vehicle has transitioned to the travel state, even if for example there is another vehicle in a stopped state ahead of the vehicle, the other vehicle can be prevented from being recognized as an object to be controlled. Consequently, a situation in which the own vehicle, in accordance with another vehicle in a stopped state, is kept in the same stopped state as the other vehicle, can be prevented. Therefore when starting to drive the own vehicle, the own vehicle can start moving without the influence from objects ahead of the own vehicle, allowing travel to be controlled according to the intentions of the driver.

Furthermore, the object to be controlled is recognized when a determination has been made that the own vehicle has transitioned from a stopped state to a travel state. Therefore after transitioning to the travel state, in accordance with an object to be controlled in the same way as the prior art, acceleration and deceleration of the own vehicle can be performed so as to track the object to be controlled.

(2) In aspect (1), the travel state may be a state in which the own vehicle has moved a predetermined distance from the stopped state.

According to aspect (2), the travel state is a state in which the own vehicle has moved a predetermined distance from the stopped state. Therefore after the own vehicle has started traveling from the stopped state and moved a predetermined distance, the own vehicle transitions to the travel state, and the travel control device recognizes objects to be controlled. As a result, when the own vehicle starts moving, even if for example there is another vehicle in a stopped state ahead, the travel control device does not recognize the other vehicle in the stopped state as an object to be controlled, and the own vehicle can move a predetermined distance. Furthermore, the travel control device, after the own vehicle has moved the predetermined distance and the other vehicle in the stopped state is outside the detection range of the object detection device, can recognize a new other vehicle as an object to be controlled. Accordingly, when starting to drive the own vehicle, the own vehicle can start moving without the influence from objects ahead of the own vehicle, allowing travel to be controlled according to the intentions of the driver.

(3) In aspect (1), the travel state may be a state in which a predetermined time has elapsed since the own vehicle started traveling.

According to aspect (3), the travel state is a state in which a predetermined time has elapsed since the own vehicle started traveling. Therefore the travel control device recognizes objects to be controlled when the own vehicle transitions to the travel state after moving for a predetermined time after starting traveling from a stopped state. As a result, when the own vehicle starts moving, even if for example there is another vehicle in a stopped state ahead, the travel control device does not recognize the other vehicle in the stopped state as an object to be controlled until a predetermined time has elapsed, allowing the own vehicle to move for a predetermined time. Furthermore, the travel control device, after the predetermined time has elapsed and the own vehicle moves, and the other vehicle in the stopped state is outside the detection range of the object detection device, can recognize a new other vehicle as an object to be controlled. Accordingly, when starting to drive the own vehicle, the own vehicle can start moving without the influence from objects ahead of the own vehicle, allowing travel to be controlled according to the intentions of the driver.

(4) In any of aspects (1) to (3), the travel control device, until a determination has been made that the own vehicle has transitioned from the stopped state to the travel state, may not recognize the object detected by the object detection device as the object to be controlled if the object is determined to be a stationary object, and may recognize the object as the object to be controlled if the object is determined to be a moving object.

According to aspect (4), until a determination has been made that the own vehicle has transitioned from a stopped state to a travel state, if an object is determined to be stationary the object is not recognized as an object to be controlled, and if an object is determined to be moving, the object is recognized as an object to be controlled. Therefore, unnecessary recognition of stationary objects as objects to be controlled can be prevented, and if an object is a moving object the moving object can be quickly recognized as an object to be controlled. Furthermore, objects to be controlled are recognized when a determination has been made that the own vehicle has transitioned from a stopped state to a travel state. Therefore after transitioning to the travel state, in accordance with an object to be controlled in the same way as the prior art, acceleration and deceleration of the own vehicle can be performed so as to track the object to be controlled. Accordingly, when starting to drive the own vehicle, the own vehicle can start moving without the influence from objects ahead of the own vehicle, allowing travel control to take place quickly according to the intentions of the driver.

Advantageous Effects of Invention

According to the embodiments of the invention, the travel control device, when starting travel control from when the vehicle is in a stopped state, recognizes the object to be controlled when a determination has been made that the vehicle has moved from a stopped state to a travel state. Therefore when driving of the vehicle starts, until the determination has been made that the vehicle has transitioned to the travel state, even if for example there is another vehicle in a stopped state ahead of the vehicle, the other vehicle can be prevented from being recognized as an object to be controlled. Consequently, a situation in which the own vehicle, in accordance with another vehicle in a stopped state, is kept in the same stopped state as the other vehicle, can be prevented. Therefore when starting to drive the own vehicle, the own vehicle can start moving without the influence from objects ahead of the own vehicle, allowing travel to be controlled according to the intentions of the driver.

Furthermore, the object to be controlled is recognized when a determination has been made that the own vehicle has transitioned from a stopped state to a travel state. Therefore after transitioning to the travel state, in accordance with an object to be controlled in the same way as the prior art, acceleration and deceleration of the own vehicle can be performed so as to track the object to be controlled.

DESCRIPTION OF EMBODIMENTS

A vehicle control device according to an embodiment of the invention is described below with reference to the drawings.

Figure 1:
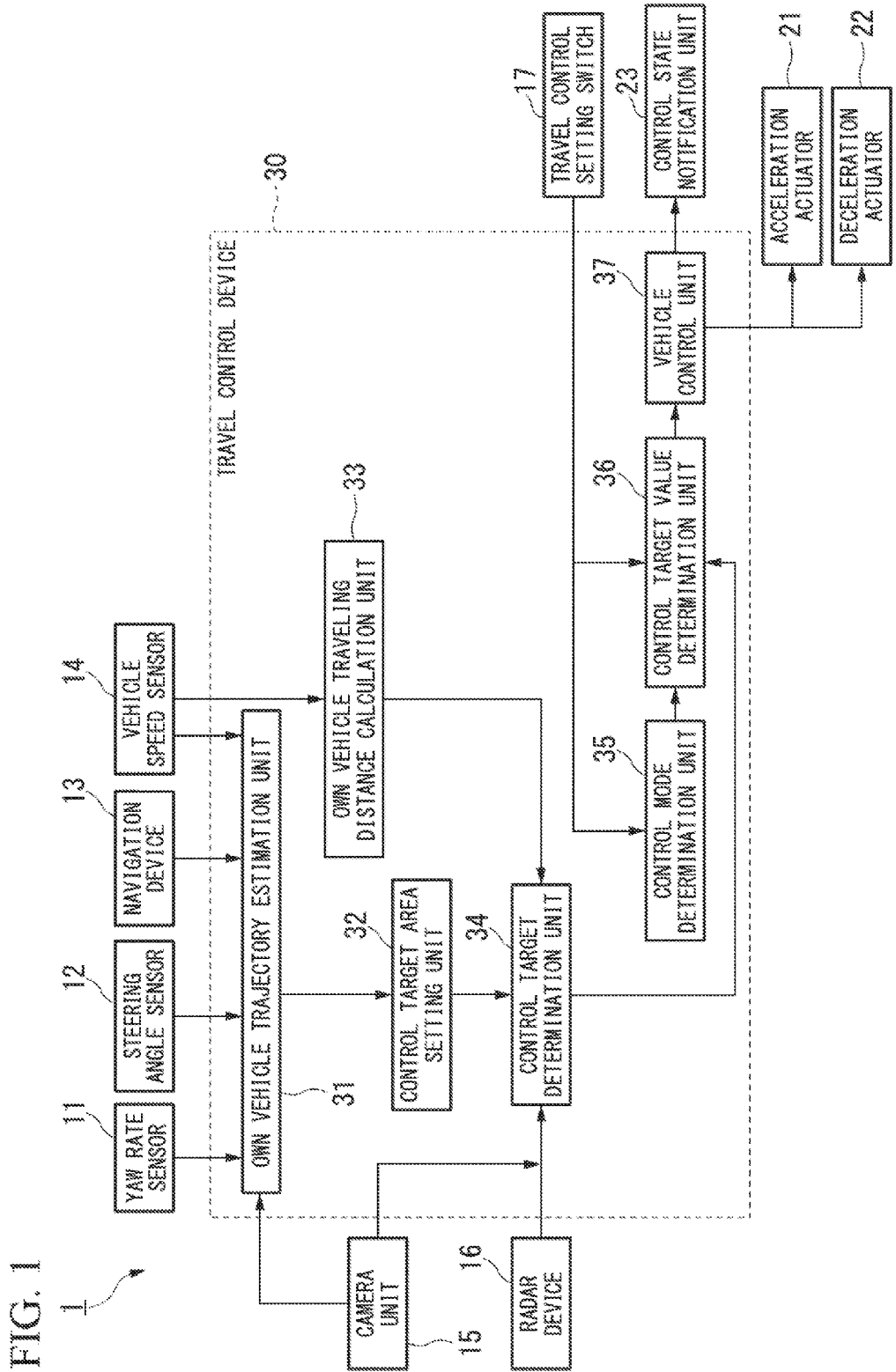
FIG. 1 is a block diagram showing a vehicle control device according to an embodiment of the invention.

FIG. 1 is a block diagram showing a vehicle control device 1 according to the embodiment.

As shown in FIG. 1, the vehicle control device 1 according to the embodiment is installed for example in a vehicle that travels by transmitting driving force produced by an internal combustion engine or the like to drive wheels via a transmission, and comprises; a yaw rate sensor 11, a steering angle sensor 12, a navigation device 13, a vehicle speed sensor 14, a camera unit 15 (object detection device), a radar device 16 (object detection device), a travel control setting switch 17, an acceleration actuator 21, a deceleration actuator 22, a control state notification unit 23, and a travel control device 30.

The yaw rate sensor 11 detects the angular velocity about the vertical axis of the center of gravity of the vehicle, that is, the so-called yaw rate, and outputs the result to the travel control device 30.

The steering angle sensor 12, for example, detects the steering angle (operating angle) of the steering wheel operated by the driver, or the actual steering angle (turning angle) according to the steering angle of the steering wheel, and outputs the result to the travel control device 30.

The navigation device 13, for example with respect to map data recorded inside the navigation device 13, performs map matching based on current position information detected by a GPS (Global Positioning System) or D-GPS (Differential GPS) or the like, and performs processing such as finding routes to destinations and providing route guidance. The navigation device 13 outputs the current position information of the vehicle detected by the GPS or D-GPS or the like to the travel control device 30.

The vehicle speed sensor 14 detects the speed of the own vehicle and outputs the result to the travel control device 30.

The camera unit 15 detects objects in front of the vehicle, such as other vehicles traveling in front of the vehicle (hereafter preceding vehicles) and other vehicles parked in front of the vehicle. Specifically, the camera unit 15 comprises; a camera (not shown) furnished with an imaging element such as a CCD (Charge-Coupled Device) or CMOS (Complementary Metal Oxide Semiconductor), and an image processing section (not shown) that performs image processing based on the information from the imaging element. The image processing section, with respect to images captured by the camera of the outside in front of the own vehicle in the traveling direction, performs predetermined image processing such as filtering and image binarization, generates image data formed from pixels in a two-dimensional array, and outputs the data to the travel control device 30.

Furthermore, the camera unit 15 detects information about the driving lanes (for example white lines) on the road surface, and outputs the result to the travel control device 30. The travel control device 30 may further comprise a so-called lane keeping assist system which, based on this lane information, controls the steering so that the vehicle travels within the lane.

The radar device 16 emits, for example, electromagnetic waves such as laser light or milliwaves towards a detection region in an appropriate detection direction (for example, forward in the traveling direction of the own vehicle), receives the reflected electromagnetic waves when the emitted electromagnetic waves are reflected by an object outside the vehicle (for example another vehicle ahead of the vehicle), detects objects based on the received electromagnetic waves (reflected waves), and outputs the result to the travel control device 30.

The travel control setting switch 17 is a switch that the driver operates with the intention to start or stop travel control.

Travel control in the present embodiment is, for example, control performed with respect to a preceding vehicle that is an object to be controlled, and is performed by two control modes, namely following distance control mode which only controls the distance to preceding vehicles, and cruise mode with a following distance control function which controls the distance from the preceding vehicle and also keeps the speed of the vehicle constant when there are no objects subject to following distance control.

Furthermore, travel control begins when, for example, the ignition is turned on while the travel control setting switch 17 is in the ON state, or when the travel control main switch of the travel control setting switch 17 is turned on during travel. In addition, for example when the own vehicle has temporarily stopped with the travel control switch in the ON state, and is then driven again, travel control is automatically resumed when the accelerator pedal is pressed.

The travel control setting switch 17 is for example composed of a plurality of button switches, including such switches as a travel control main switch configured so as to toggle the travel control system between ON and OFF states with each press, a control mode switch which sets the control mode, an acceleration and deceleration operation switch which increases or decreases the set speed during cruise control, and a following distance setting switch which sets the size of the following distance during following distance control. For example, the two control modes, that is, the following distance control mode and the cruise mode with following distance control function, can be selected by the control mode switch of the travel control setting switch 17.

In the present embodiment, the travel control setting switch 17 is provided on a spoke of a steering wheel of a vehicle (not shown), disposed such that the driver can press the travel control setting switch 17 while holding the steering wheel. As a result, when driving on a curved road or the like, the driver can easily press and operate the travel control setting switch 17 while maintaining steering control.

A travel control setting switch 17 configured in this way outputs command signals to the travel control device 30 according to the command contents produced by the driver operating the various switches.

An acceleration actuator 21 for example controls the throttle opening according to the commands of the travel control device 30, thereby accelerating the own vehicle.

A deceleration actuator 22 for example controls the throttle opening and the brake fluid pressure according to the commands of the travel control device 30, thereby decelerating the own vehicle.

The control state notification unit 23 notifies information output from the travel control device 30 in relation to travel control to the driver as the control state of the own vehicle.

As the control state notification unit 23, for example, display lights in the instruments provided on the instrument panel inside the vehicle, the display of a navigation unit, and a speaker that can emit a warning sound are suitable. Specifically, the control state notification unit 23 notifies the control state of the own vehicle such as the on/off state of the travel control system, the control mode, the cruise control speed setting, and the size of the following distance for following distance control, set by the driver using the travel control setting switch 17, to an occupant of the own vehicle such as the driver through audio output and visual display.

(Travel Control Device)

The travel control device 30 comprises; an own vehicle trajectory estimation unit 31, a control target area setting unit 32, an own vehicle travel distance calculation unit 33, a control target determination unit 34, a control mode determination unit 35, a control target value determination unit 36, and a vehicle control unit 37.

The own vehicle trajectory estimation unit 31 calculates an estimated travel trajectory of the own vehicle. Into the own vehicle trajectory estimation unit 31 are input the detection signals of the yaw rate sensor 11, the steering angle sensor 12, and the vehicle speed sensor 14, current position information of the own vehicle detected by the GPS or D-GPS or the like of the navigation device 13, roadway lane information obtained from the images captured by the camera unit 15, and the like. The own vehicle trajectory estimation unit 31 calculates the estimated travel trajectory of the own vehicle based on these input values, and outputs the result to the control target area setting unit 32. The input values input to the own vehicle trajectory estimation unit 31 above are examples only, and the embodiment is not limited thereto.

The control target area setting unit 32 sets an area (hereafter a control target area) in which objects deemed objects to be controlled for the own vehicle can be detected by the camera unit 15 and the radar device 16.

The control target area setting unit 32 sets the control target area based on the estimated travel trajectory of the own vehicle calculated by the own vehicle trajectory estimation unit 31. In the present embodiment, for example, based on the estimated travel trajectory of the own vehicle, an area which has a predetermined width perpendicular to the estimated travel trajectory and is within a fixed distance extending along the estimated travel trajectory (for example an area within a 100 m range from the vehicle) is set as the control target area.

The control target area setting unit 32 outputs the control target area set in the above manner, to the control target determination unit 34.

The own vehicle travel distance calculation unit 33 calculates the travel distance of the own vehicle when the own vehicle begins traveling from a stopped state. In the present embodiment, the own vehicle travel distance calculation unit 33 calculates the travel distance from the speed of the own vehicle detected by the vehicle speed sensor 14 and the traveling time. This method of calculating the travel distance using the own vehicle travel distance calculation unit 33 is merely an example, and the embodiment is not limited thereto. For example, the own vehicle travel distance calculation unit 33 may calculate the travel distance of the own vehicle when the own vehicle starts moving from a stopped state, based on the current position information of the own vehicle detected by the GPS or D-GPS or the like of the navigation device 13, and the lane information of roadways obtained from the images captured by the camera unit 15.

The own vehicle travel distance calculation unit 33 outputs the travel distance of the own vehicle calculated in the above manner, to the control target determination unit 34.

The control target determination unit 34 determines the objects (for example preceding vehicles) that should be objects to be controlled. In the present embodiment, the control target determination unit 34, from among the preceding vehicle detection data detected based on the image data input from the camera unit 15 and the beat signal input from the radar device 16, extracts preceding vehicles that are present in the control target determination area set by the control target area setting unit 32. In addition, the control target determination unit 34, based on the image data input from the camera unit 15 and the beat signal input from the radar device 16, calculates the relative distance and relative speed and the like between the extracted preceding vehicle and the own vehicle, and based on the moving characteristics and the like of the extracted preceding vehicle, determines whether or not the preceding vehicle present in the control target determination area is a control object to be tracked.

If the control target determination unit 34 determines that the extracted preceding vehicle should be an object to be controlled, information about the relative distance and relative speed of the own vehicle and the preceding vehicle and the like is output to the control target value determination unit 36.

Here, examples of the judgment conditions of the control target determination unit 34 for objects to be controlled are: that the other vehicle is present inside the control target area; that when multiple other vehicles are detected inside the control target area, the other vehicle closest in distance to the own vehicle is prioritized as an object to be controlled; or that another vehicle that is nearing the own vehicle is prioritized as an object to be controlled.

Incidentally, when the own vehicle starts travel control from a stopped state, then on the travel trajectory estimated by the own vehicle trajectory estimation unit 31 when the own vehicle starts moving, there might be another vehicle in a stopped state. In this situation, in a conventional travel control device, the control target determination unit 34 detects the other vehicle in the stopped state as an object to be controlled, and in accordance with the other vehicle in the stopped state detected as an object to be controlled, maintains the own vehicle in the same stopped state as the other vehicle.

In contrast, the travel control device 30 of the present embodiment, when starting travel control from when the own vehicle is in a stopped state, recognizes objects to be controlled when a determination has been made that the own vehicle has transitioned from a stopped state to a travel state. In other words, in the period of time until the own vehicle is determined to have transitioned from a stopped state to a travel state, objects to be controlled are not recognized. As a result, the own vehicle, when the own vehicle starts travel control from a stopped state, can quickly start moving from the stopped state without the influence from the other vehicle in a stopped state ahead of the own vehicle. In the travel control of the present embodiment, the "travel state" means a state in which the own vehicle has moved at least a predetermined distance from the stopped state. Furthermore the specific processing flow for travel control will be described later.

The control mode determination unit 35 determines whether the control mode is following distance control mode, or cruise mode with following distance control. The determination of the control mode is performed, for example, based on the command signal of the control mode switch of the travel control setting switch 17.

The control target value determination unit 36 determines various control target values such as when travel control starts and finishes, the vehicle speed setting of travel control, and the following distance setting, based on; the command contents (for example the set vehicle speed and the target following distance) input from the travel control setting switch 17, information input from the control target determination unit 34 such as the relative distance and relative speed of the own vehicle and the preceding vehicle, the control mode input from the control mode determination unit 35, and the like. Then the control target value determination unit 36 outputs the various information of the control target values required for travel control, to the vehicle control unit 37.

The vehicle control unit 37, based on the control target values (such as the target speed and the target acceleration and deceleration speeds) determined by the control target value determination unit 36, performs travel control of the own vehicle by controlling the acceleration actuator 21 and the deceleration actuator 22, and outputs the current control state to the control state notification unit 23.

Processing Flow of Travel Control According to the Present Embodiment

Figure 2:
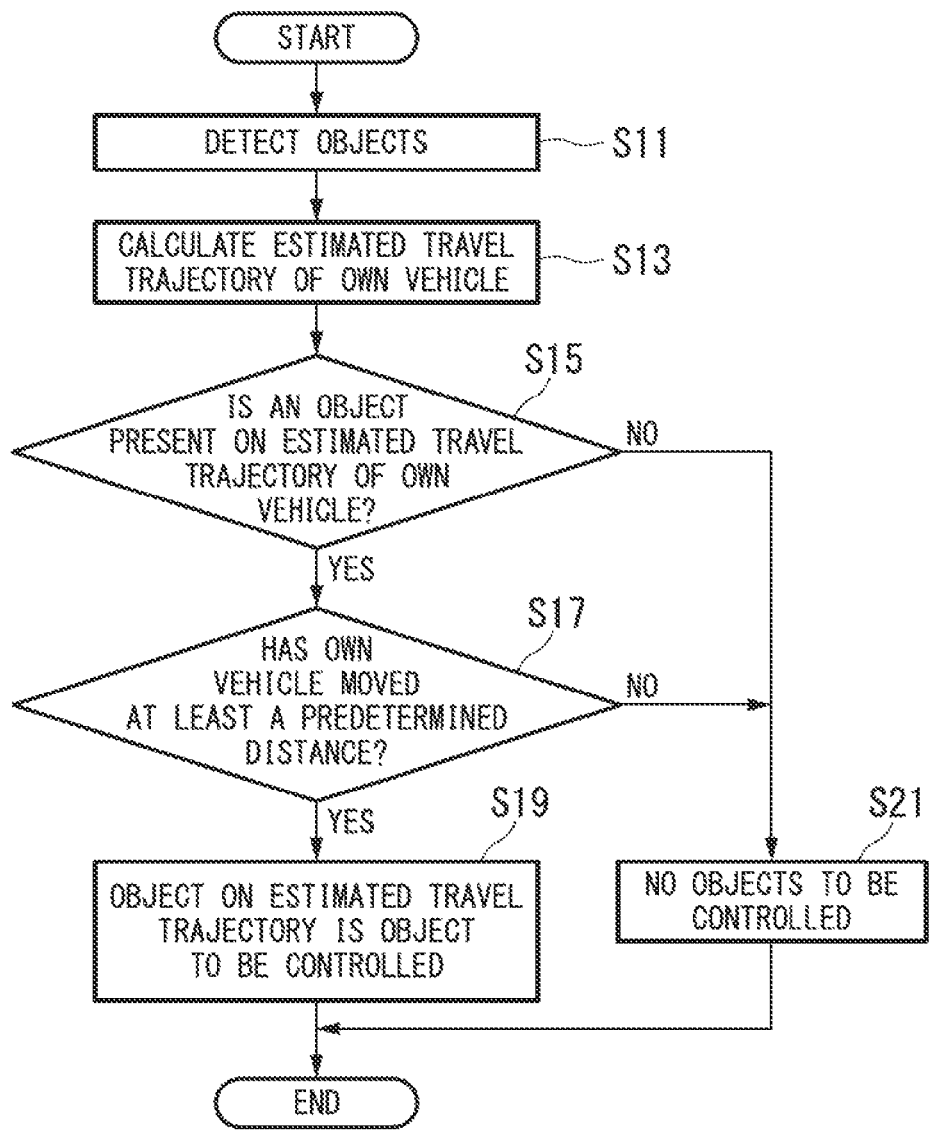
FIG. 2 is a flowchart showing travel control according to an embodiment of the invention.

FIG. 2 is a flow chart of travel control according to the present embodiment.

Below, each step (S11 to S21) of travel control according to the present embodiment is described using the flow chart of FIG. 2. In the description of travel control below, the reference symbols of each component are shown in FIG. 1.

The flow chart shown in FIG. 2 shows, for example, the processing content of travel control performed in the travel control device 30 (see FIG. 1) after the ignition is turned ON with the travel control setting switch 17 already ON with the own vehicle in a stopped state. Furthermore, the travel control device 30, upon completing the series of steps from START to END in the flow chart shown in FIG. 2, repeats the processing flow again from START.

(Step S11)

As shown in FIG. 2, in the travel control of the present embodiment, first in step S11, objects present in front of the own vehicle are detected. Detection of objects present in front of the own vehicle is performed by the control target determination unit 34 based on the image data input from the camera unit 15 and the beat signal input from the radar device 16. At the point when detection of objects present in front of the own vehicle has finished, the flow proceeds to step S13.

(Step S13)

In step S13, calculation of the estimated travel trajectory of the own vehicle is performed. Calculation of the estimated travel trajectory of the own vehicle is performed by the own vehicle trajectory estimation unit 31 based on, for example, the detection signals of the yaw rate sensor 11, the steering angle sensor 12, and the vehicle speed sensor 14, current position information of the own vehicle detected by the GPS or D-GPS or the like of the navigation device 13, and roadway lane information obtained from the images captured by the camera unit 15. At the point when calculation of the estimated travel trajectory of the own vehicle has finished, the flow proceeds to step S15.

(Step S15)

In step S15, a determination is made as to whether or not an object is present on the estimated travel trajectory of the own vehicle. The determination as to whether or not an object is present on the estimated travel trajectory of the own vehicle is performed by the control target determination unit 34 based on, for example, information about objects present in front of the own vehicle detected in step S11, and the estimated travel trajectory of the own vehicle calculated in step S13.

In step S15, if a determination is made that "an object is present on the estimated travel trajectory of the own vehicle" (YES), the flow proceeds to step S17.

(Step S17)

In step S17, a determination is made as to whether or not the own vehicle has moved at least a predetermined distance from the stopped state. Here, in the travel control of the present embodiment, the "travel state" is a state in which the own vehicle has moved at least a predetermined distance from the stopped state. That is to say, in step S17, by determining whether or not the own vehicle has moved at least a predetermined distance, a determination is made as to whether or not the own vehicle has transitioned from a stopped state to a travel state.

The determination as to whether or not the distance moved by the own vehicle is at least a predetermined value is performed by the own vehicle travel distance calculation unit 33, based on, for example; the detection signal from the vehicle speed sensor 14, the current position information of the own vehicle detected by the GPS or D-GPS or the like of the navigation device 13, and roadway lane information obtained from the captured images of the camera unit 15. In step S17, if a determination is made that "the vehicle has moved at least a predetermined distance" (YES), the own vehicle is considered to have transitioned to the travel state, and the flow proceeds to step S19.

(Step S19)

In step S19, objects on the estimated travel trajectory of the own vehicle are deemed objects to be controlled. Here, in step S17, the distance moved by the own vehicle is at least a predetermined value, and the own vehicle is determined to be in a travel state. That is to say, in step S19, if a determination is made that the own vehicle has transitioned from a stopped state to a travel state (YES was determined in step S17), then objects on the estimated travel trajectory of the own vehicle (for example preceding vehicles) are recognized as objects to be controlled, and travel control is performed. As a result, the own vehicle, under the control of either of the following distance control mode or cruise mode with following distance control, is capable of travel that tracks the preceding vehicle which is the object to be controlled.

(Step S21)

On the other hand, if in step S15 a determination is made that "no object is present on the estimated travel trajectory of the own vehicle" (NO), the flow proceeds to step S21. In step S21, a judgment is made that there are "no objects to be controlled" in front of the own vehicle, and the process flow is terminated. As a result, the own vehicle, with either of the following distance control mode or cruise mode with following distance control, set as the control mode, is capable of cruising, for example.

Furthermore, in step S17, if a determination is made that "the vehicle has not moved at least a predetermined distance" (NO), the own vehicle is considered not to be moving in a travel state and the flow proceeds to step S21.

In this situation, even though in step S15 it is judged that "an object is present on the estimated travel trajectory of the own vehicle" (YES), in step S21 a determination is made that there are "no objects to be controlled" in front of the own vehicle, and the process flow is terminated. That is to say, even if there is another vehicle in a stopped state in front of the own vehicle, the process flow is terminated without recognizing the other vehicle as an object to be controlled.

Then, the process flow is repeated by executing the processing again from START, and in step 17, if a determination is made that "the vehicle has moved at least a predetermined distance" (YES) (that is, if a determination is made that the own vehicle has transitioned from a stopped state to a travel state), objects on the estimated travel trajectory of the own vehicle (for example preceding vehicles) are recognized as objects to be controlled (step S19) and travel control in accordance with the preceding vehicle is performed. In this manner, in the travel control of the present embodiment, until a determination has been made that the own vehicle has transitioned to a travel state when starting to drive, even if other vehicles in a stopped state are present in front of the own vehicle, the other vehicles are not recognized as objects to be controlled, and a determination is made that there are no objects to be controlled.

Effects of the Embodiment

According to the present embodiment, the travel control device 30, when starting travel control from when the own vehicle is in a stopped state, recognizes objects to be controlled (step S19) when a determination is made that the own vehicle has transitioned from a stopped state to a travel state (YES in step S17). Therefore until the own vehicle is determined to have transitioned to a travel state when starting to drive, even if there is another vehicle in a stopped state in front, recognition of the other vehicle as an object to be controlled can be prevented (when NO is determined in step S17, and in step S21). Consequently, a situation in which the own vehicle, in accordance with another vehicle in a stopped state, is kept in the same stopped state as the other vehicle, can be prevented. Therefore when starting to drive the own vehicle, the own vehicle can start moving without the influence from objects ahead of the own vehicle, allowing travel control according to the intentions of the driver.

Furthermore, objects to be controlled are recognized when a determination has been made that the own vehicle has transitioned from a stopped state to a travel state. Therefore after transitioning to the travel state, the own vehicle can accelerate and decelerate so as to track the object to be controlled, in accordance with the object to be controlled in the same way as the prior art.

Furthermore, the travel state is a state in which the own vehicle has moved a predetermined distance from the stopped state. Therefore after the own vehicle begins traveling from the stopped state and a predetermined time has elapsed, the own vehicle transitions to the travel state and the travel control device 30 recognizes objects to be controlled (when YES is determined in step in step S17, and in step S19). As a result, when the own vehicle begins traveling, for example even if there is another vehicle in a stopped state ahead, the travel control device does not recognize the other vehicle in the stopped state as an object to be controlled (step S21), and the own vehicle can move a predetermined distance. Furthermore, the travel control device, after the own vehicle has moved a predetermined distance and the other vehicle in the stopped state is outside the detection range of the object detection device, can recognize a new other vehicle as an object to be controlled. Accordingly, when starting to drive the own vehicle, the own vehicle can start moving without the influence from objects ahead of the own vehicle, allowing travel control according to the intentions of the driver.

Figure 3:
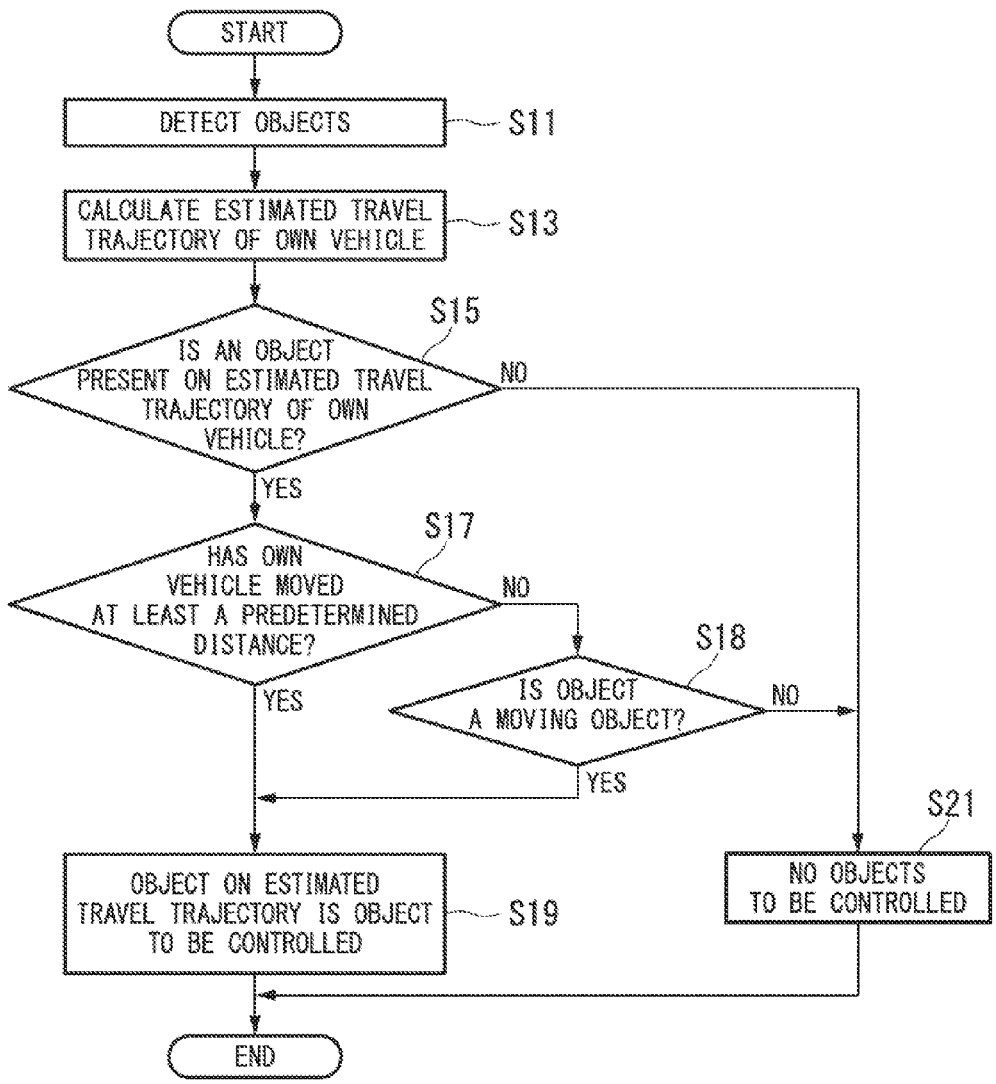
FIG. 3 is a flowchart showing travel control according to a first modified example of the embodiment.

Processing Flow of Travel Control According to First Modified Example of the Embodiment FIG. 3 is a flow chart showing travel control according to a first modified example of the embodiment.

Hereafter, each step (S11 to S21) of travel control according to the first modified example of the embodiment is described using the flow chart shown in FIG. 3. In the description of travel control below, the reference symbols of each component are shown in FIG. 1.

In the process flow of travel control according to the embodiment, in step S17 "whether or not the own vehicle has moved at least a predetermined distance from a stopped state" is determined. If a determination is made that "the vehicle has not moved at least a predetermined distance" (NO), the flow proceeds to step S21 and there are judged to be "no objects to be controlled" in front of the own vehicle (see FIG. 2).

In contrast, as shown in FIG. 3, the process flow of travel control according to the first modified example of the embodiment differs from the embodiment in that; in step S17, when determining "whether or not the own vehicle has moved at least a predetermined distance" from a stopped state, if a determination is made that "the own vehicle has not moved at least a predetermined distance" (NO), then in step 18 "whether or not the object is a moving object" is determined. A description of constituent parts that are the same as the embodiment is omitted, with only those constituent parts that differ described here.

(Step S18)

When a determination is made in step S17 that "the vehicle has not moved at least a predetermined distance" (NO), the flow proceeds to step S18. In step S18, for an object present on the estimated travel trajectory of the own vehicle, "whether or not the object is a moving object" is determined.

In step S18, if a determination is made that "the object is a moving object" (YES), the flow proceeds to step S19. As a result, a determination is made that "objects on the estimated travel trajectory of the own vehicle are deemed objects to be controlled" (step S19). That is to say, when the object on the estimated travel trajectory of the own vehicle is a moving object (for example another vehicle in a moving state), objects to be controlled are recognized quickly. As a result, the own vehicle, under the control of either of the following distance control mode or cruise mode with following distance control, is capable of travel that tracks the other vehicle which is the object to be controlled and is moving.

In contrast, in step S18, if a determination is made that "the object is not a moving object" (NO), that is, the object on the estimated travel trajectory of the own vehicle is a stationary object (for example another vehicle in a stopped state), the flow proceeds to step S21.

In this case, even though in step S15 a determination was made that "an object is present on the estimated travel trajectory of the own vehicle" (YES), if "the object is not a moving object" (that is, the object is a stationary object), in step S21 a determination is made that there are "no objects to be controlled" in front of the own vehicle, and the process flow is terminated. Then, travel control is performed through repeated execution of the process flow by executing the process again from START. Accordingly, in the travel control device 30, until a determination has been made that the own vehicle has transitioned from a stopped state to a travel state, if a detected object is determined to be a stationary object (for example another vehicle in a stopped state), the object is not recognized as an object to be controlled, and if the object is determined to be a moving object (for example another vehicle in a moving state), the object is recognized as an object to be controlled.

Thus, in the travel control of the first modified example of the embodiment, even before a determination is made that the own vehicle has transitioned to a travel state when starting to drive the own vehicle (NO in step S17), if there is another vehicle in a moving state ahead (YES in step S18), that vehicle is quickly recognized as an object to be controlled (step S19). As a result, the own vehicle, under the control of either of the following distance control mode or cruise mode with following distance control, is capable of travel that quickly tracks the other vehicle which is the object to be controlled and is moving.

Effects of First Modified Example of the Embodiment

According to the first modified example of the embodiment, when starting travel control from when the vehicle is in a stopped state, until the own vehicle is determined to have transitioned to a travel state from a stopped state (YES in step S17), when an object is a stationary object (NO in step S18), the object is not recognized as an object to be controlled (step S21), and if the object is a moving object (YES in step S18) the object is recognized as an object to be controlled (step S19). Therefore, unnecessary recognition of stationary objects as objects to be controlled can be prevented, and when an object is a moving object the moving object can be quickly recognized as an object to be controlled. Furthermore, objects to be controlled are recognized (step S19) when a determination is made that the own vehicle has transitioned from a stopped state to a travel state (YES in step S17). Therefore after transitioning to the travel state, the own vehicle can accelerate and decelerate so as to track the object to be controlled, in accordance with the object to be controlled in the same way as the prior art. Consequently, when starting to drive the own vehicle, the own vehicle can start moving without the influence from objects ahead of the own vehicle, allowing travel control to be performed quickly according to the intentions of the driver.

Figure 4:
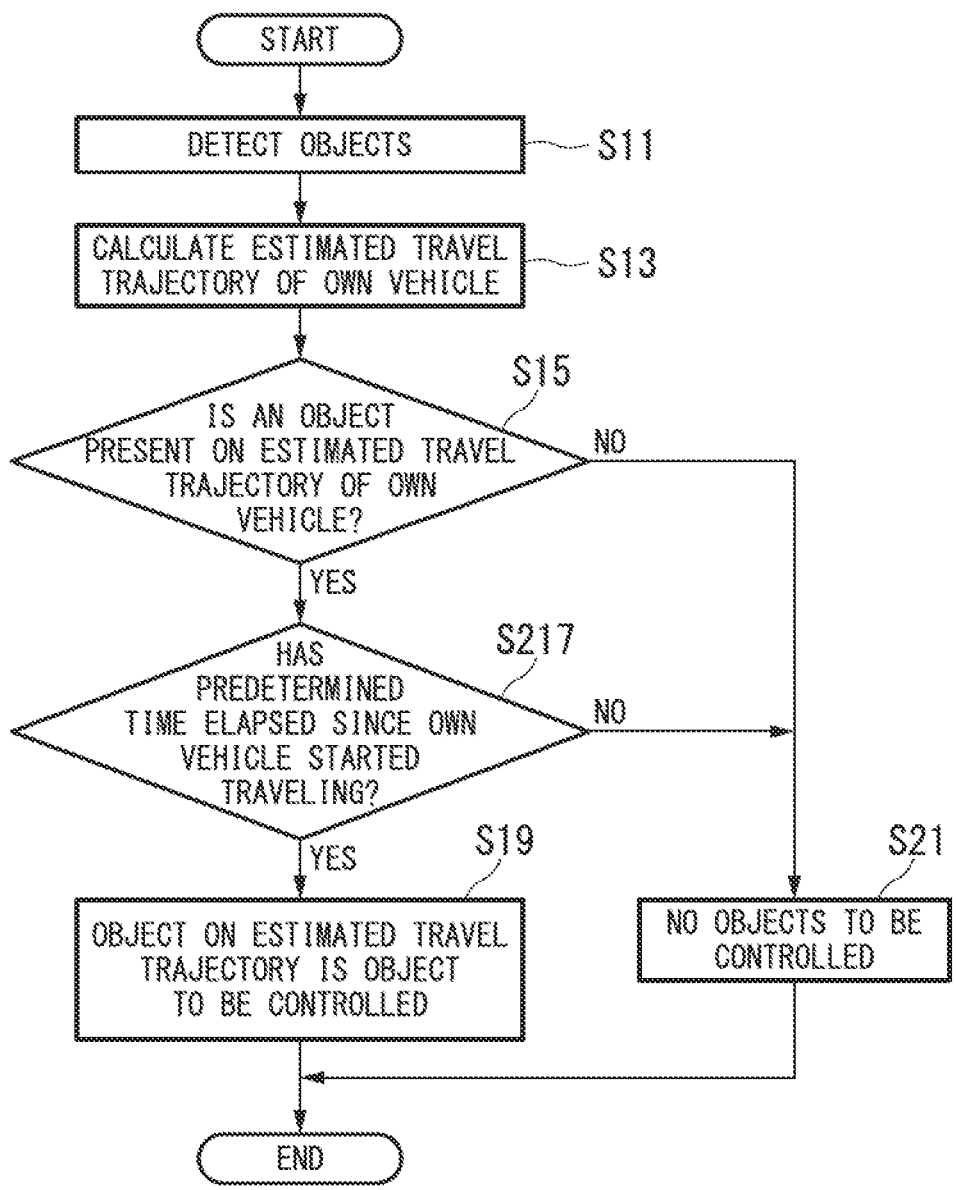
FIG. 4 is a flowchart showing travel control according to a second modified example of the embodiment.

Processing Flow of Travel Control According to Second Modified Example of the Embodiment FIG. 4 is a flow chart showing travel control according to a second modified example of the embodiment.

Hereafter, each step (S11 to S21) of travel control according to the second modified example of the embodiment is described using the flow chart shown in FIG. 4. In the description of travel control below, the reference symbols of each component are shown in FIG. 1.

In the process flow of travel control according to the embodiment and the first modified example of the embodiment, whether or not the own vehicle has transitioned from a stopped state to a travel state was determined by determining in step S17 "whether or not the own vehicle has moved at least a predetermined distance" from a stopped state (see FIG. 2 and FIG. 3).

In contrast, as shown in FIG. 4, the process flow of travel control according to the second modified example of the embodiment differs from the embodiment and the first modified example of the embodiment in that whether the own vehicle has transitioned from a stopped state to a travel state is determined by determining in step S217 "whether or not a predetermined time has elapsed since the own vehicle started traveling" from the stopped state. Description of constituent parts that are the same as the embodiment is omitted, with only those constituent parts that differ described here.

(Step S217)

In step S217, a determination is made as to "whether or not a predetermined time has elapsed since the own vehicle started traveling" from the stopped state. Here, in the travel control of the second modified example of the embodiment, the "travel state" is a state in which the own vehicle has started traveling from a stopped state, and a predetermined time has elapsed. That is to say, in step S217 whether or not the own vehicle has transitioned from the stopped state to the travel state is determined by determining whether or not a predetermined time has elapsed since the own vehicle started traveling from a stopped state.

The determination as to whether or not a predetermined time has elapsed since the own vehicle started traveling is performed by counting using, for example, an internal timer or the like (not shown) in the navigation device 13 or the travel control device 30. In step S217, when the count of the internal timer reaches a predetermined number and a determination is made that "a predetermined time has elapsed since the own vehicle started traveling" (YES), the own vehicle is considered to have transitioned to the travel state and the flow proceeds to step S19.

In contrast, in step S217, if the count of the internal timer does not reach a predetermined number and a determination is made that "a predetermined time has not elapsed since the own vehicle started traveling" (NO), the own vehicle is considered not to have transitioned to the travel state, and the flow proceeds to step S21. In step S21, there are judged to be "no objects to be controlled" in front of the own vehicle, and the process flow ends.

As a result, the own vehicle is able to travel under the control of either of the following distance control mode or cruise mode with following distance control.

Effects of Second Modified Example of the Embodiment

According to the second modified example of the embodiment, the travel state is a state in which a predetermined time has elapsed since the own vehicle started traveling. Therefore after the own vehicle moves for a predetermined time after starting traveling from the stopped state, the own vehicle transitions to the travel state and the travel control device 30 recognizes objects to be controlled. As a result, when the own vehicle first starts moving, even if for example there are other vehicles in a stopped state ahead, the travel control device 30 does not recognize the other vehicles in a stopped state as objects to be controlled until a predetermined time has elapsed, and the own vehicle can move for a predetermined time. Moreover, the travel control device 30, when the own vehicle has moved for the predetermined time, after the other vehicle in the stopped state is outside the detection range of the camera unit 15 and the radar device 16, can recognize a new other vehicle as an object to be controlled. Accordingly, when starting to drive the own vehicle, the own vehicle can start moving without the influence from objects ahead of the own vehicle, allowing travel control according to the intentions of the driver.

The technical scope of the present invention is not limited to the above embodiment, and various modifications can be made without departing from the spirit or scope of the present invention.

In the embodiment and the modified examples of the embodiment, a camera unit 15 and a radar device 16 were used as an object detection device, but the object detection device is not limited thereto. Furthermore, in the embodiment and the modified examples of the embodiment, a camera unit 15 and a radar device 16 were used together as an object detection device, adopting a so-called fusion method. However, one or other of the camera unit 15 and the radar device 16 might be used individually as the object detection device.

The embodiment and the modified examples of the embodiment may be combined. For example, by combining the embodiment and the second modified example of the embodiment, as soon as either one of "whether or not the own vehicle has moved at least a predetermined distance" (step S17) or "whether or not a predetermined time has elapsed since the own vehicle started traveling" (step S217) is determined, a determination can be made that the own vehicle has transitioned to a travel state. Furthermore, for example, by combining the first modified example of the embodiment and the second modified example of the embodiment, if by determining "whether or not a predetermined time has elapsed since the own vehicle started traveling" (step S217) a judgment is made that "a predetermined time has not elapsed since the own vehicle started traveling" (NO), then the determination as to "whether or not the object is a moving object" (step S18) may be made.

The constituent elements of the above embodiment can be substituted with various known constituent elements without departing from the spirit or scope of the present invention. Moreover the modified examples of the embodiment described above can be combined in arbitrary combinations.

DESCRIPTION OF THE REFERENCE SYMBOLS

1 Vehicle control device
15 Camera unit (object detection device)
16 Radar device (object detection device)
30 Travel control device

The invention claimed is:

1. A vehicle control device comprising:
an object detection device configured to detect an object in front of an own vehicle;
a processor configured to recognize the object detected by the object detection device as an object requiring the vehicle to be controlled, and perform travel control in accordance with the object requiring the vehicle to be controlled; and
a travel control switch which a driver of the own vehicle manually operates with intention to start or stop the travel control,
wherein
the processor is configured, when starting the travel control from when the own vehicle is in a stopped state with the travel control switch in an ON state, to recognize the object requiring the vehicle to be controlled when a determination has been made that the own vehicle has moved from the stopped state to a travel state, and
the travel state is at least one of a state in which the own vehicle has moved a predetermined distance from the stopped state and a state in which a predetermined time has elapsed since the own vehicle started traveling.

2. The vehicle control device according to claim 1, wherein
the processor is configured, until a determination has been made that the own vehicle has transitioned from the stopped state to the travel state, not to recognize the object detected by the object detection device as the object requiring the vehicle to be controlled if the object is determined to be a stationary object, and to recognize the object as the object requiring the vehicle to be controlled if the object is determined to be a moving object.

3. A vehicle control device comprising:

an object detection device configured to detect an object in front of an own vehicle;

a travel control switch which a driver of the own vehicle manually operates with intention to start or stop the travel control;

a processor configured to start the travel control from a time when the own vehicle is in a stopped state and the travel control switch in is an ON state;

recognize the object detected by the object detection device as an object requiring the vehicle to be controlled when the processor has determined that the own vehicle has moved from a stopped state to a travel state;

perform travel control of the own vehicle by controlling an acceleration actuator or a deceleration actuator; and output a current control state to a control state notification unit, wherein the travel state is at least one of a state in which the own vehicle has moved a predetermined distance from the stopped state and a state in which a predetermined time has elapsed since the own vehicle started traveling.

4. The vehicle control device according to claim 3, wherein the processor is further configured to not recognize the object detected by the object detection device, as the object requiring the vehicle to be controlled, if the object is determined to be a stationary object, and recognize the object as the object requiring the vehicle to be controlled if the object is determined to be a moving object.

5. The vehicle control device according to claim 4, wherein the object recognized as the object requiring the vehicle to be controlled is a vehicle in front of the own vehicle.

* * * * *